Patented Feb. 16, 1926.

1,573,468

UNITED STATES PATENT OFFICE.

FRANK EDWIN WIESER, OF SAN LUIS OBISPO, CALIFORNIA, ASSIGNOR OF ONE-HALF TO ROY R. PALMER, OF SAN LUIS OBISPO, CALIFORNIA.

COMPOSITION FOR TREATING BRAKE LININGS.

No Drawing. Application filed July 16, 1924, Serial No. 726,388. Renewed July 9, 1925.

*To all whom it may concern:*

Be it known that I, FRANK EDWIN WIESER, a citizen of the United States, and a resident of San Luis Obispo, in the county of San Luis Obispo and State of California, have invented certain new and useful Improvements in a Composition for Treating Brake Linings, of which the following is a specification.

This invention relates to a composition and has for its object the provision of a product for softening hard, glazed, or burned automobile brake linings to prevent noises when the brakes are applied.

A further object of the invention is the provision of a composition composed of such ingredients that the same will be absorbed by automobile brake linings no matter what their condition, for making them pliable to prevent squeaking and chattering of the brake band when the brakes are applied and which will also prevent the brake band from causing a rigid gripping action and thereby producing sudden shock, but nevertheless will place the brake band in such condition that they will firmly hold the brakes and provide a long life and better service of the same.

This invention will be best understood from a consideration of the following detailed description; but nevertheless it is to be understood that the invention is not confined to the disclosure, being susceptible of such changes and modifications which shall define no material departure from the salient features of the invention as expressed in the appended claim.

In carrying out my invention I provide a composition composed of 96 parts of turpentine, or kerosene, 16 parts of castor oil, 8 parts of graphite and 1 part of oil of citronella or banana oil. These ingredients are placed in an agitator and thoroughly stirred until they have become thoroughly incorporated and then placed in suitable squirt tins with spouts. This compound is then squirted on the brake lining until the lining is thoroughly saturated. This can be done with the wheel and brake in place or new brake lining may be placed in the compound, until thoroughly impregnated and then mounted on the brake bands.

It will be found that the linings so prepared will be soft and pliable so that when they are secured in proper position in the brake mechanism will cause the brakes to take a firm hold without the rapid grabbing which is so undesirable in most forms of brake construction.

In the preferred form of composition I intend to employ turpentine and oil of citronella with the castor oil and graphite but kerosene may if desired, replace the turpentine, and banana oil the oil of citronella.

What I claim is:

A composition for treating brake linings comprising 96 parts of turpentine, 16 parts of castor oil, 8 parts of graphite, and 1 part of oil of citronella.

FRANK EDWIN WIESER.